United States Patent [19]

Matty et al.

[11] 4,333,150
[45] Jun. 1, 1982

[54] SIGNAL RECEIVING APPARATUS AND METHOD

[75] Inventors: Thomas C. Matty, N. Huntingdon; Aaron C. James, Jefferson Boro, both of Pa.

[73] Assignee: Westinghouse Electric Corp., Pittsburgh, Pa.

[21] Appl. No.: 116,119

[22] Filed: Jan. 28, 1980

[51] Int. Cl.³ .................. H04M 1/50; G01R 23/02
[52] U.S. Cl. .................. 364/484; 179/84 VF; 364/728; 364/487; 340/825.71
[58] Field of Search .......... 364/484, 487, 734, 728; 179/84 VF; 340/171 R, 171 A, 170 R, 171 PF

[56] References Cited

U.S. PATENT DOCUMENTS

| | | | |
|---|---|---|---|
| 3,446,949 | 5/1969 | Trimble | 364/734 X |
| 3,551,889 | 12/1970 | Miller | 340/171 |
| 3,557,354 | 1/1971 | Trimble | 364/734 X |
| 3,810,161 | 5/1974 | Sahasrabudhe | 340/170 R |
| 4,001,521 | 1/1977 | Fukata et al. | 179/84 VF |
| 4,015,082 | 3/1977 | Matty et al. | 340/171 PF |
| 4,021,653 | 5/1977 | Sharp et al. | 179/84 VF X |
| 4,025,730 | 5/1977 | Sawai | 179/84 VF |
| 4,064,488 | 12/1977 | Chapman | 364/487 X |
| 4,067,014 | 1/1978 | Wheeler et al. | 364/487 X |
| 4,088,960 | 5/1978 | Osborne | 364/487 X |
| 4,100,378 | 7/1978 | Claasen et al. | 364/484 X |
| 4,185,172 | 1/1980 | Melindo et al. | 179/84 VF X |
| 4,216,463 | 8/1980 | Backof, Jr. et al. | 340/171 R |

OTHER PUBLICATIONS

Claasen et al.: A Digital Receiver for Tone Detection Applications, IEEE Transactions on Communications, vol. COM-29, No. 12, Dec. 1976, pp. 1291-1300.
Sheingold (editor), Analog-Digital Conversion Handbook, published by Analog Devices, Norwood, MA.
Perform Waveform Averaging by Addition, pp. I-87/88.
Zilog, Z80-CPU and Z80A-CPU Technical Manual.

Primary Examiner—Felix D. Gruber
Attorney, Agent, or Firm—R. G. Brodahl

[57] ABSTRACT

A signal receiving apparatus and method are provided to decode an input signal to determine the presence of at least one desired frequency component in that input signal. A number of signal samples are taken in relation to the known frequency of that signal component, and data compaction and analysis operations are performed to identify that desired frequency component. A multiple comparison made with a predetermined threshold magnitude is provided to identify the frequency component in that input signal.

12 Claims, 15 Drawing Figures

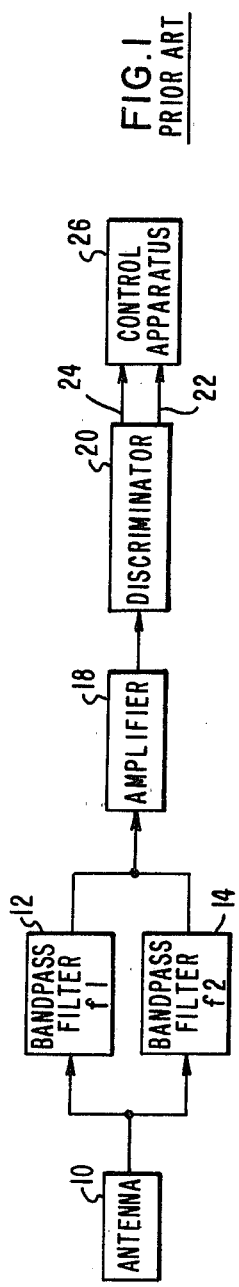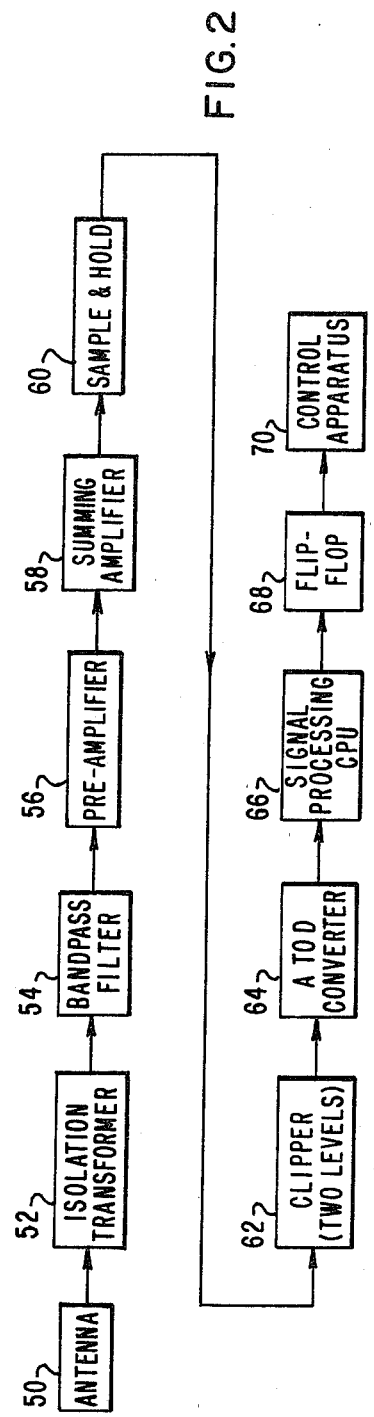

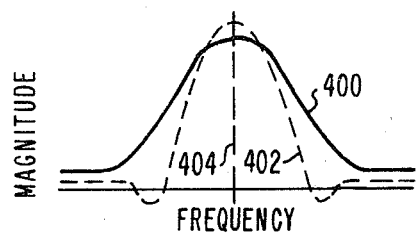
FIG. 12
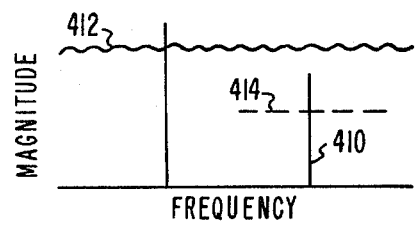
FIG. 13
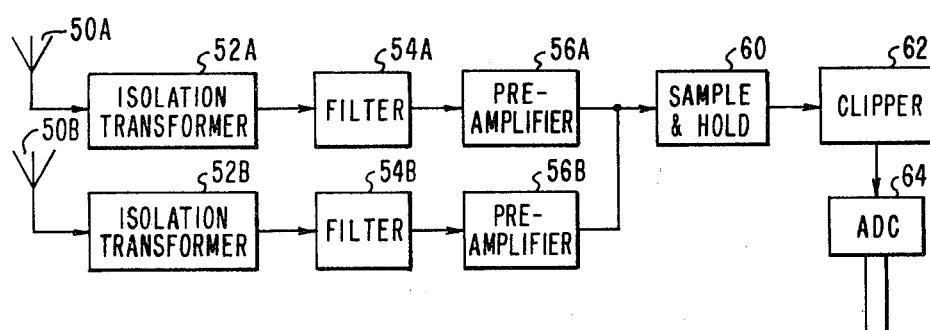
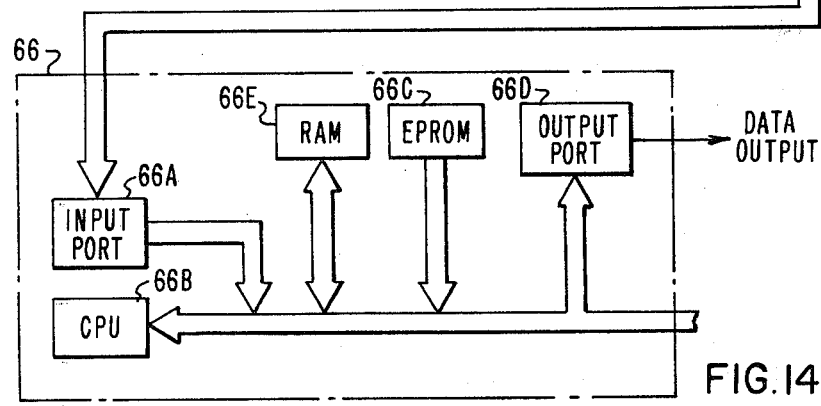
FIG. 14

SIGNAL RECEIVING APPARATUS AND METHOD

CROSS-REFERENCE TO RELATED APPLICATION

The present application is related to a patent application Ser. No. 920,317, now U.S. Pat. No. 4,209,828 which was filed on June 28, 1978 by D. L. Rush et al and entitled "Speed Decoding And Speed Error Determinating Control Apparatus And Method".

BACKGROUND OF THE INVENTION

It is known in the prior art to provide a signal receiving apparatus for responding to an applied signal from an input device such as an antenna to produce a decoded serial or parallel binary data output. The well known, modem apparatus in current use with telephone line communication systems, includes such a signal receiving apparatus. The use of multiple bandpass filter devices for decoding an input signal is shown in U.S. Pat. No. 3,810,161 of A. P. Sahasrabudhe, in U.S. Pat. No. 3,966,149 of T. C. Matty et al. and in U.S. Pat. No. 4,015,082 of T. C. Matty.

An article, entitled "Atlanta Airport People Mover" that was published in the Conference Record of the 28th IEEE Vehicular Technology Group for a Denver, Colorado meeting in March 1978, describes a prior art information transfer system operative with a vehicle stopped in a passenger station.

Another article, entitled "Recent Applications of Microprocessor Technology To People Mover Systems" that was published in the Conference Record of the 29th IEEE Vehicular Technology Group for a Chicago, Illinois meeting in March 1979, describes a prior art information transfer system operative with a vehicle stopped in a passenger station.

An additional article entitled Sao Paulo Metro E-W Line Innovations was published in the Conference Record of the IEEE Industry Applications Society for a Los Angeles California meeting in October 1977 and discloses the use of a train identification system including a high speed communication link to load a train identification information signal message.

SUMMARY OF THE PRESENT INVENTION

An input signal receiving apparatus provides decoding to determine if one or more of desired signal frequency components are present in a given input signal. A predetermined noise rejection operation is provided from a selected number of samples of that input signal that are taken, with the actual frequency discrimination being determined by establishing the number of such samples that are taken for this purpose in relation to known desired signal frequency components to be identified. The input signal samples are compacted in accordance with the known desired frequency signal to accentuate the desired frequency components to be detected. Correlation coefficients are established for each of selected sine and cosine reference waves that are selected in accordance with the known signal frequency components, which sine and cosine coefficients are used as multipliers and the resulting products are summed to provide a magnitude in relation to each of the desired signal frequency components. A multiple comparison is made of these magnitudes with each other and with predetermined threshold values to provide the required detection of the desired frequency signal components.

BRIEF DESCRIPTION OF THE DRAWINGS

FIG. 1 is a functional block diagram of a prior art input signal receiver apparatus;

FIG. 2 shows the input signal receiving apparatus of the present invention;

FIG. 12 shows the comparison between desired frequency signal identification by prior art Fourier transform analysis techniques and by the present invention;

FIG. 13 shows the improved signal to noise ratio desired frequency signal identification in accordance with the present invention; and FIG. 14 shows the hardware block diagram of the signal receiver in accordance with the present invention.

DESCRIPTION OF THE PREFERRED EMBODIMENT

Figure 3:
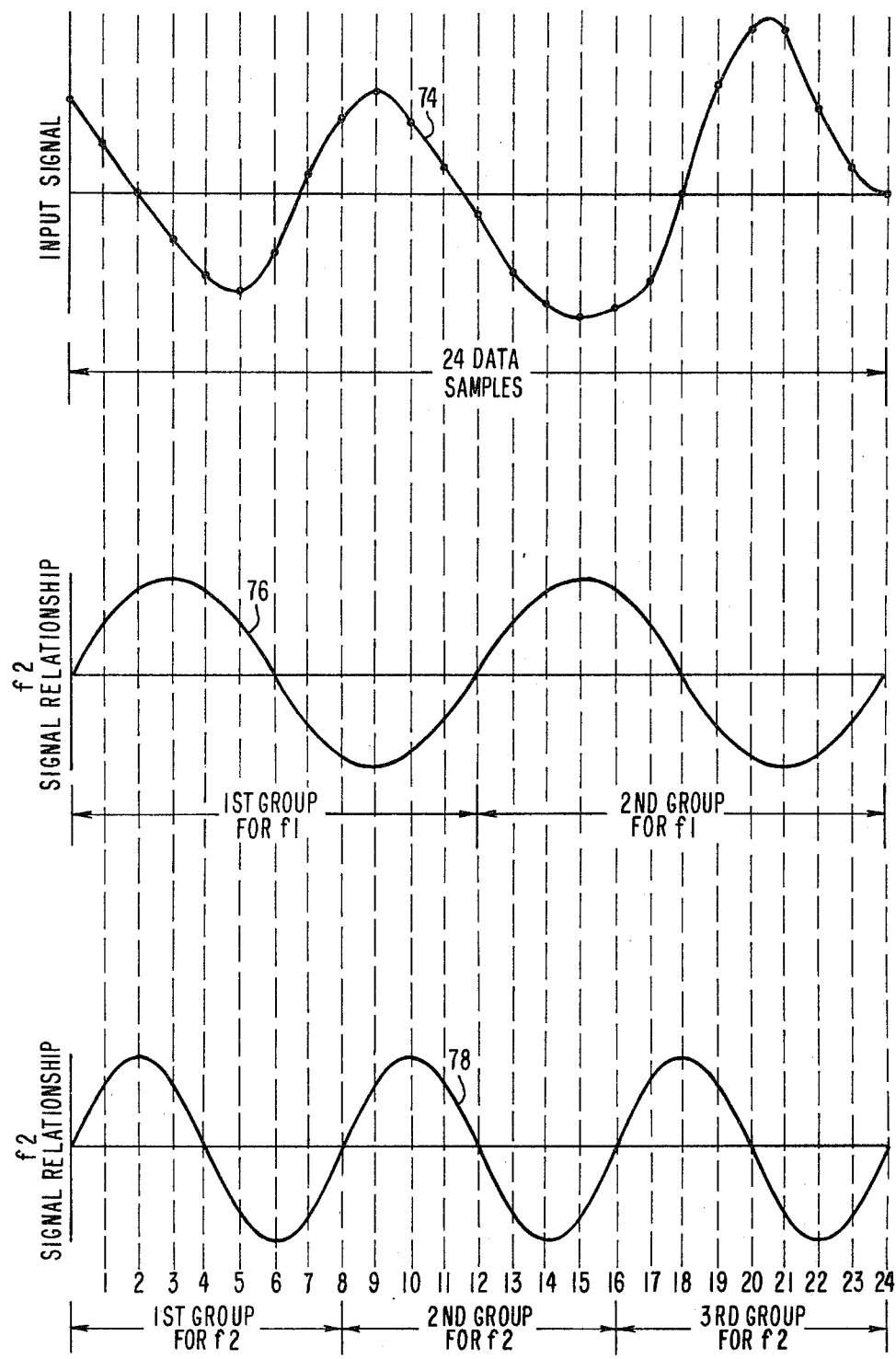
FIG. 3 graphically shows the input signal divided into a selected group of data samples and in relation to the f1 reference wave and the f2 reference wave.

In FIG. 1, there is shown a prior art input signal receiver apparatus including an antenna 10 for receiving input signals from a suitable source a first bandpass filter 12 having a center frequency corresponding to the f1 signal component of the applied input signal and a second bandpass filter 14 having a center frequency corresponding to the f2 component of the applied input signal. The f1 and f2 signal components pass through an amplifier 18 to a discriminator 20 which has a data output 22 for providing either one of the f1 or f2 signal components received by the antenna 10 and a clock output 24 for synchronizing the subsequent processing of the frequency component data on output 22, such as by the control apparatus 26.

In FIG. 2, there is shown the input signal receiver apparatus for providing the input signal, including for example two desired frequency components, to the signal determination operation of the present invention and including an antenna 50 for receiving input signals from a suitable source, and an isolation transformer 52 which limits the current into the apparatus and protects against high voltage surges and provides isolation between the antenna and the subsequent receiver module. The bandpass filters 54 are high pass in design but due to the secondary inductance of the transformer 52, they are operative as effectively bandpass filters. The bandpass filter 54 removes low frequency components such as 720 Hz and limits the spectrum to the desired range of interest. A pre-amplifier 56 is provided for additional gain. A summing amplifier 58 sums the signals from the two desired signal frequency components, which could be provided by dual channel inputs, and provides a signal which is fed to a sample and hold circuit 60, which samples the input signal and holds the value for subsequent processing. A clipper 62 limits the input signal at each of plus and minus predetermined voltage values. An analog-to-digital converter 64 digitizes the analog signal and transfers it to a signal processor CPU 66. A program is stored in read only memory ROM which provides instructions to signal processing microprocessor or CPU 66. After processing has occurred, the CPU 66 outputs data to a flip-flop memory 68 in serial format. The desired f1 and the f2 signal frequency components are now identified and supplied to a subsequent control apparatus 70, such as for a controlled transit vehicle or the like.

As shown in FIG. 3, the known desired f1 frequency component is such that with twenty-four input signal samples taken, there are included two full cycles or groups of the f1 signal component, with each f1 signal component cycle including 12 samples. Compacting can be done to assist the determination of the f1 frequency signal component by superimposing the second group of twelve samples on the first group of twelve samples to provide a first improved input signal waveform. As shown in FIG. 3, the f2 frequency is such that with twenty-four input signal samples taken, there are included three full cycles or groups of the f2 signal component, with each f2 signal component cycle including 8 samples. Compacting can be done to assist the determination of the f2 frequency signal component by superimposing each of the second group of eight samples and the third group of eight samples on the first group of eight samples to provide a second improved input signal waveform. For this example, the f1 frequency can be 8.769 KHz and the f2 frequency can be 5.845 KHz.

For the purpose of example only, assume that input signal that is received by the antenna 50 includes four groups of twenty-four signal samples. These four groups of input signal samples are then respectively superimposed as will be later described to provide the summed input signal waveform 74 shown in FIG. 3. The twenty-four signal samples are selected because the desired f1 signal component is known to have two full cycles during the time period of the twenty-four samples as shown by curve 76, and the desired f2 signal component is known to have three full cycles during the time period of the twenty-four samples as shown by the curve 78.

Figure 4A:
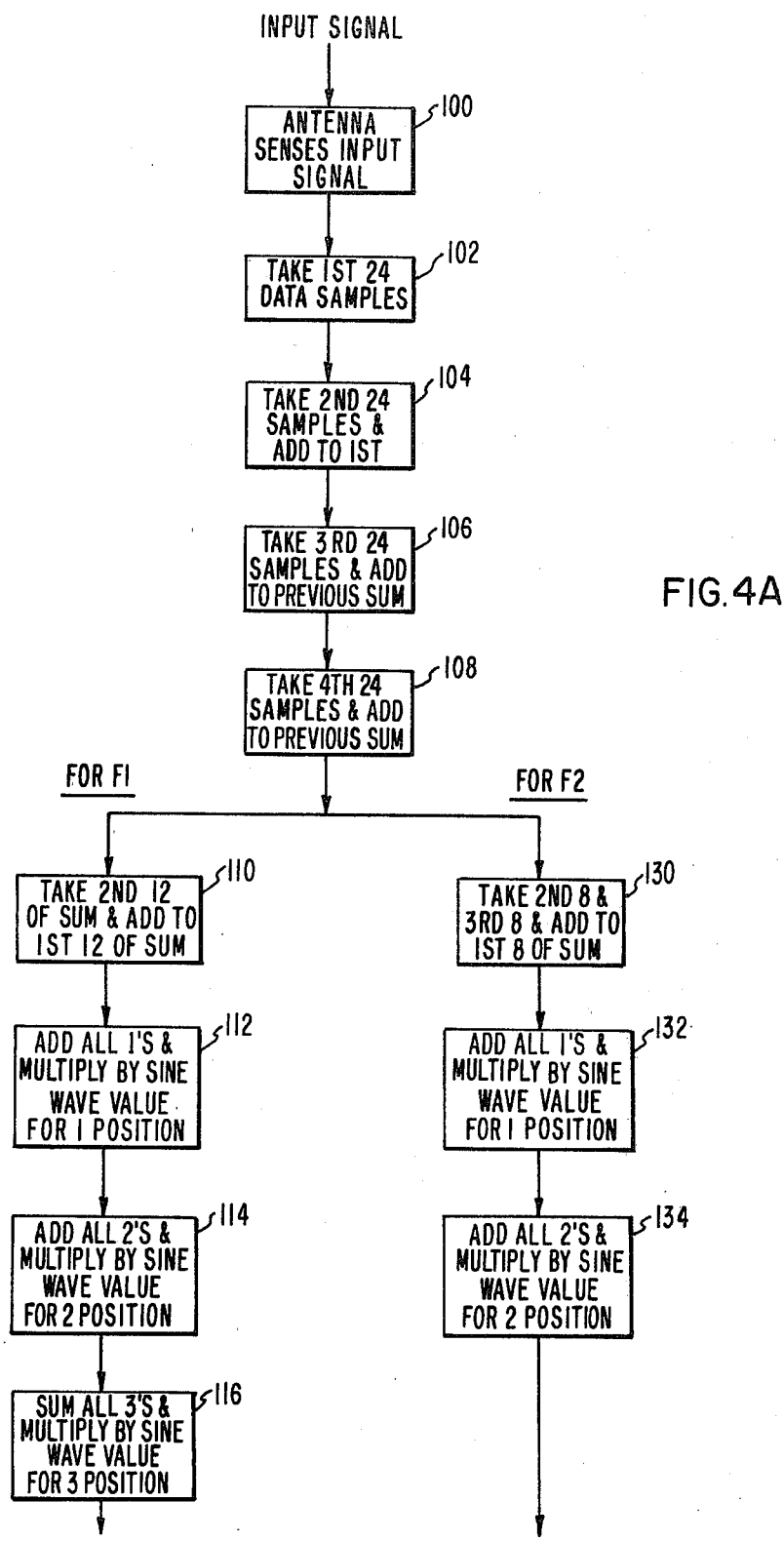
FIG. 4A and B taken together show the compacting operation and the fourier transform operation applied to determine one of the first frequency f1 component or the second frequency f2 component in the input signal.
Figure 4B:
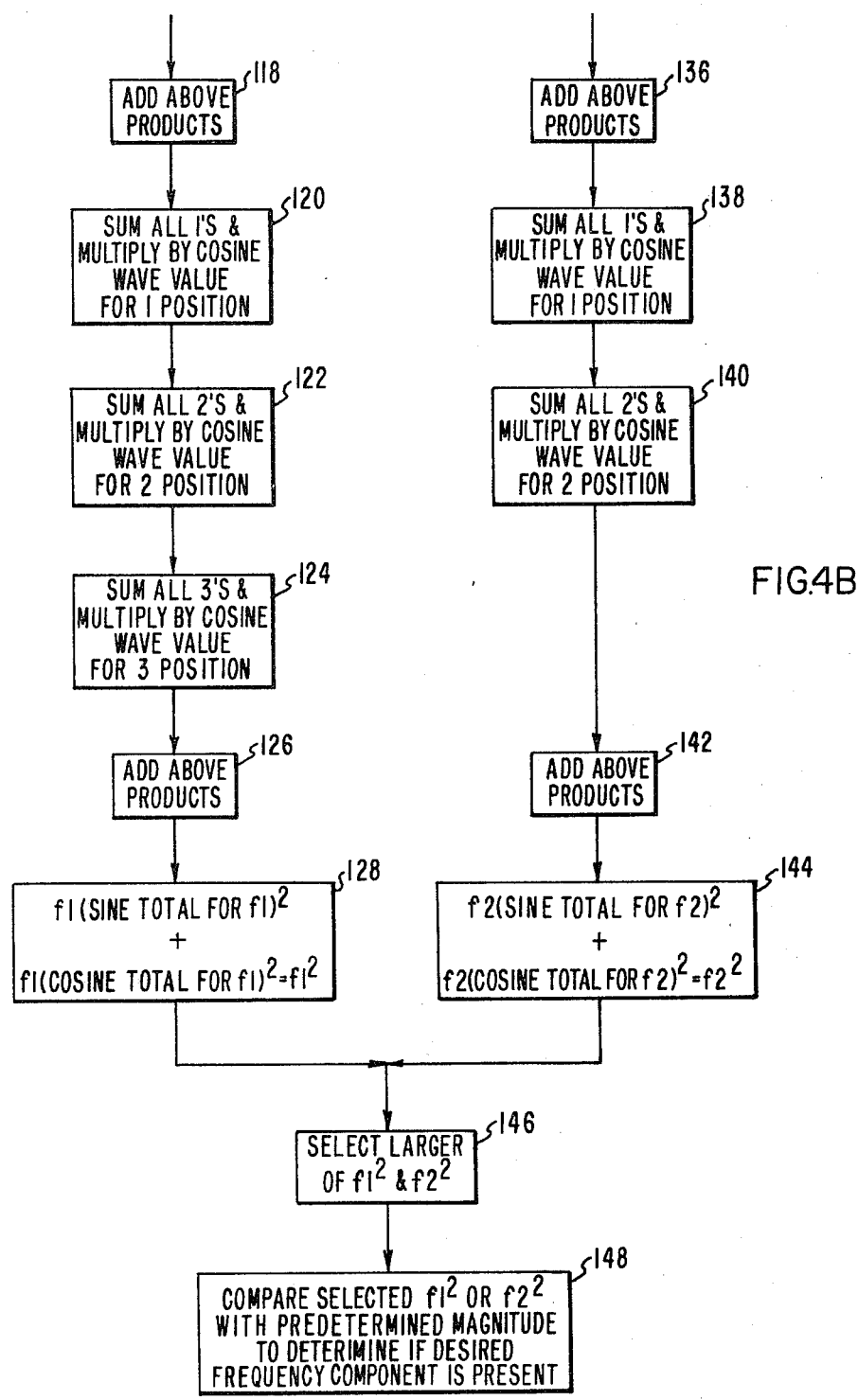

In FIG. 4, there is shown a process chart of the operations performed in the signal processor CPU 66 in accordance with the present invention to determine the desired f1 and f2 frequency components in the input signal. At block 100, the antenna senses the input signal. At block 102, a first group of 24 initial data samples is taken. At block 104, a second group of 24 initial data samples is taken of the input signal and the second group of data samples is superimposed on the first group of data samples, such that the first samples of each group are summed, the second samples of each group are summed and so forth. At block 106, a third group of 24 initial data samples is taken and superimposed on top of the first two groups of data samples, such that the first samples of each group are summed, the second samples of each group are summed and so forth. At block 108, a fourth group of 24 initial data samples is taken and superimposed on top of the previous first, second and third groups of data samples, such that the first samples of each group are summed, the second samples of each group are summed and so forth. For purpose of example, assume that the curve 74 shown in FIG. 3 is the resulting summed waveform provided at block 108 from the described superimposition of these first, second, third and fourth groups of 24 initial input signal data samples.

Figure 5:
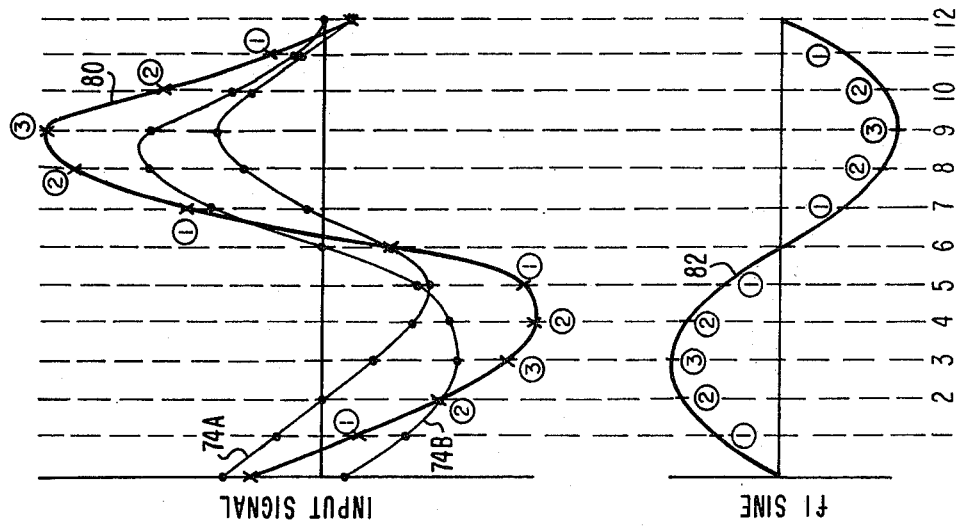
FIG. 5 shows the fourier transform operation performed in relation to a sine wave to determine the desired first frequency f1 component in the input signal.

At block 110, and as shown in FIG. 5, an input signal waveform 80 is determined in relation to the desired f1 frequency component, and in accordance with the known frequency relationship between $f_1$ and $f_2$, by superimposing the second 12 data samples shown by curve 74(B) of the summed input signal waveform 74 with the first 12 data samples shown by curve 74(A) of the summed input signal waveform 74, as shown in FIG. 3. It is to be understood that superimposing here is understood to include summing each of the first samples, each of the second samples and so forth.

Figure 6:
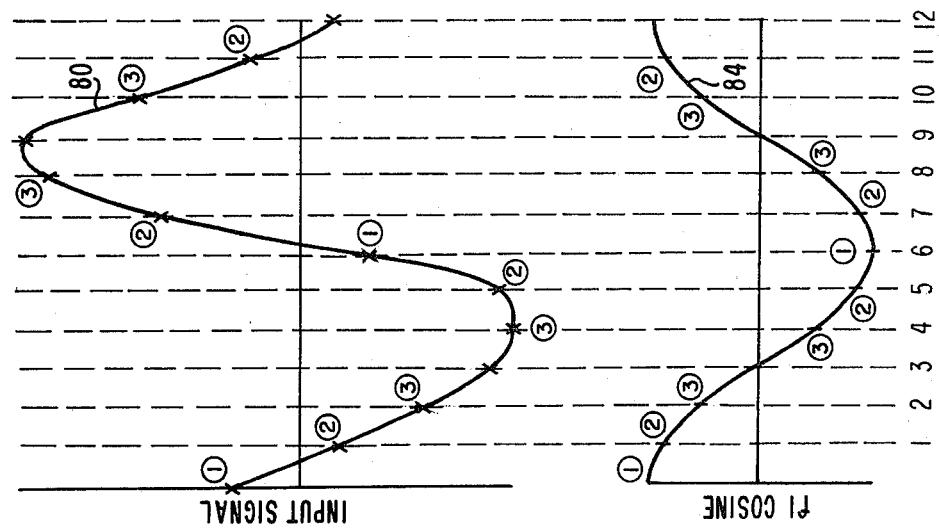
FIG. 6 shows the fourier transform operation performed in relation to a cosine wave to determine the desired first frequency f1 component in the input signal.

At block 112, and as shown in FIG. 5, the data samples for each of the four indicated (1) positions of the now provided f1 frequency signal component waveform 80 are algebraically added together and multiplied by the value of the f1 frequency reference sine wave 82 at the (1) position. Since all of the (1) positions of the sine wave 82 have the same magnitude coefficient, by algebraically adding together the (1) position values of the waveform 80 these can then be multiplied once by the (1) position coefficient of the sine wave 82. At block 114, and as shown in FIG. 5, the data samples for each of the four indicated (2) positions for the f1 frequency signal component waveform 80 are algebraically added together and multiplied by the f1 frequency reference sine wave 82 value for the (2) position. At block 116, and as shown in FIG. 5, the data samples for the two indicated (3) positions of the f1 frequency signal component waveform 80 are algebraically added and then multiplied by the sine wave 82 value for the (3) position. At block 118, the respective products resulting from the operations in blocks 112, 114 and 116 are added in relation to the f1 frequency signal component. At block 120, and as shown in FIG. 6, the f1 frequency signal component waveform 80 values corresponding to the two indicated (1) positions of the f1 frequency reference cosine wave 84 are algebraically added and then multiplied by the cosine wave 84 value for the (1) position. At block 122 and as shown in FIG. 6, the f1 frequency signal component waveform 80 values corresponding to the four indicated (2) positions of the f1 frequency reference cosine wave 84 are algebraically added and then multiplied by the cosine wave 84 value for the (2) position. In block 124 and as shown in FIG. 6, the f1 frequency signal component waveform 80 values corresponding to the four indicated (3) positions of the f1 frequency reference cosine wave 84 are algebraically added and then multiplied by the cosine wave value for that (3) position. At block 126, the total of the above products obtained at blocks 120, 122 and 124 are added together in relation to the f1 frequency signal component. At block 128, the square of the f1 sine component obtained at block 118 is added to the square of the f1 cosine component obtained at block 126 and set equal to $f1^2$.

Figure 8:
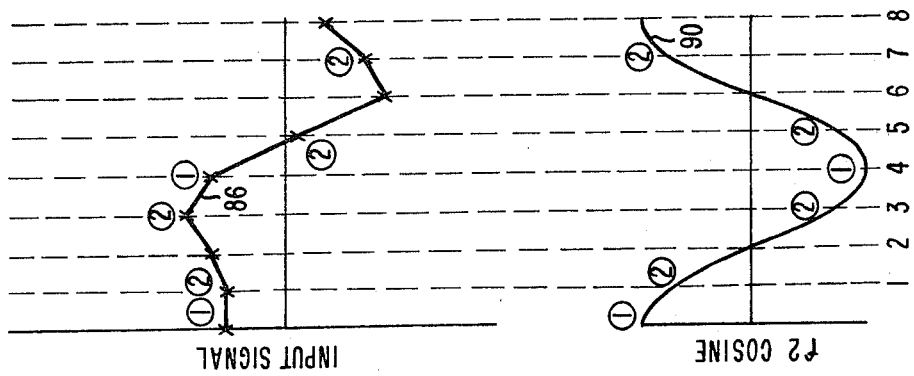
FIG. 8 shows a fourier transform operations performed in relation to a cosine wave to determine the presence of the desired second frequency f2 component in the input signal.
Figure 7:
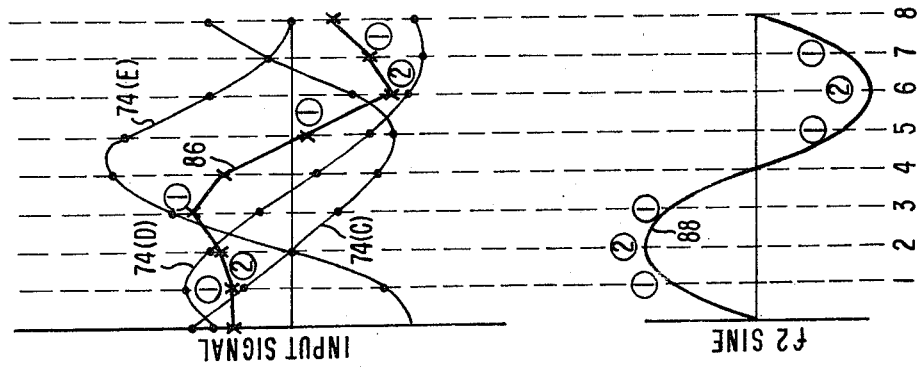
FIG. 7 shows the fourier transform operation performed in relation to a sine wave to determine the desired second frequency f2 component in the input signal.

The resulting summed waveform 74 of the superimposed four groups of 24 samples obtained at block 108 is operated on at block 130 such that the second eight data samples shown by curve 74(D) and the third eight data samples shown by curve 74(E) of that summed waveform 74 obtained at block 108 are superimposed on the first eight data samples shown by curve 74(C). At block 132 and as shown in FIG. 7, the data samples for each of the four indicated (1) positions of the now provided f2 frequency signal component waveform 86 are algebraically added together and multiplied by the value of the f2 frequency reference sine wave 88 for the (1) position. At block 134 and as shown in FIG. 7, the data samples values for each of the two indicated (2) positions of the f2 frequency signal component waveform 86 are algebraically added together and multiplied by the value of the f2 frequency reference sine wave 88 for the (2) position. At block 136, the respective products obtained in the blocks 132 and 134 are added together. At block 138, and as shown in FIG. 8, the f2 frequency signal component waveform 86 values corresponding to the two indicated (1) positions of the f2 frequency cosine wave 90 are algebraically added together and then multiplied by the value of the cosine wave 90 for the (1) position. At block 140 and as shown in FIG. 8, the f2 frequency signal component waveform 86 values corresponding to the four indicated (2) positions of the f2 cosine wave 90 are algebraically added together and multiplied by the value of the cosine wave 90 for the (2) position. At block 142, the products obtained at the respective blocks 138 an 140 are added together in relation to the f2 frequency signal component. In block 144, the square of the f2 sine component obtained at block 136 is added to the square of the f2 cosine component obtained at block 142 and set equal to f2 squared.

At block 146, a comparison is made of the $f1^2$ value obtained at block 128 with the $f2^2$ value obtained at block 144, and the larger is selected. At 148, a comparison is made of the selected $f1^2$ or $f2^2$ value with a predetermined threshold magnitude to determine if the desired f1 or f2 frequency component is above a threshold value and therefore considered to be present in the input signal summed waveform 74.

The here described signal receiving apparatus and method are operative to decode serial input signals having at least one frequency component that contains coded information. The above described Fourier transform analysis, as performed in accordance with blocks 112, 114, 116, 118, 120, 122, 124, 126 and 128 for the f1 signal component and in accordance with blocks 132, 134, 136, 138, 140, 142 and 144 for the f2 signal component is per se well known in the prior art to decompose an unknown signal waveform into a sum of sinusoid relationships of different frequencies. The amplitude and frequency of each determined sinusoid can be established to identify respective signal frequency components comprising that unknown signal waveform. This general technique is described in a book entitled The East Fourier Transform by E. O. Brigham that was published in 1974 by Prentice-Hall, Inc. The above described compaction operation on the input signal samples, as performed in accordance with blocks 104, 106 and 108 for the input signal data samples and at block 110 for the f1 frequency component and at block 130 for the f2 frequency component, in relation to f1 and f2 known desired signal components will operate to filter out a considerable portion of the noise in the received input signal. The above described compaction operation in conjunction with the Fourier analysis operation enables a better determination of the desired input signal f1 and f2 frequency components than could be obtained with either one of those operations taken alone.

The threshold magnitude of block 148 is selected in relation to known signal levels that are normally expected in a given signal system. For example, persons skilled in this art know how to adjust the internal dynamic range of the signal receiving apparatus shown in FIG. 2, such that reasonable signal values result in relation to available signal data memory space. Thusly, the threshold magnitude is selected in accordance with the known normal magnitude of the desired input signal f1 and f2 frequency components. The expected minimum and maximum signal component levels are established and the threshold magnitude is provided just below the expected normal minimum signal level.

Figure 9:
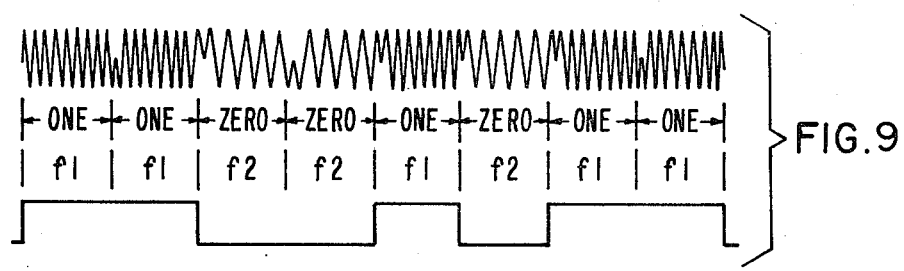
FIG. 9 shows a typical FSK coded information message signal.

In FIG. 9, there is shown a typical frequency shift keyed information message including f1 and 2 signal that can be sent to the signal receiving apparatus shown in FIG. 2, and could relate to an information message transmission from a wayside station to a transit vehicle to indicate a new destination for the vehicle or a new performance level such as a different speed to expect in the next track signal block or a different acceleration or deceleration rate for the vehicle to follow. The information message signal shown in FIG. 9 has eight bits in accordance with 110010.

Figure 10:
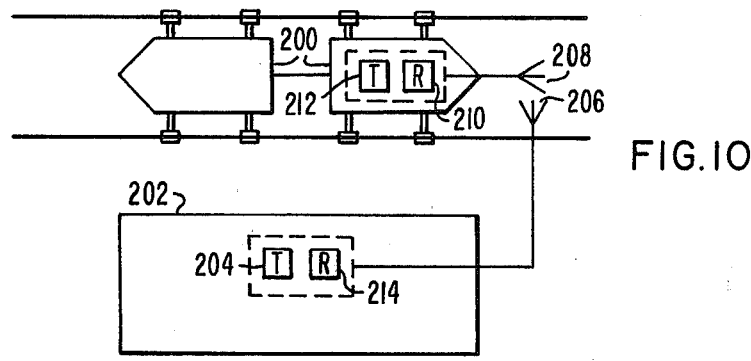
FIG. 10 shows a typical information message signal transfer apparatus provided to transfer information signals from a passenger station to a vehicle stopped in that station.

In FIG. 10, there is shown one practical application for the input signal message receiving apparatus provided in accordance with the present invention. For a vehicle 200 stopped in a passenger station 202, it may be desired that an information message be sent from the station to the vehicle and then a confirmation message be sent from the vehicle in a predetermined time period, such as ½ second, as set forth in the above referenced additional article. This information message can include identification ID signals or a vehicle performance modification such as 70% of the provided input speed command from the next occupied track signal block and the like. The involved signal environment is very noisy with vehicle propulsion currents flowing in the tracks in the order of 10,000 amperes in addition to the message signals of the order of 10 milliamps, with many auxiliary motors and other electrical devices located in relation to the vehicle and the passenger station. The station transmitter 204 supplies the information message signal bits through the station ID antenna 206. The vehicle ID antenna 208 senses and provides these message signal bits to the vehicle receiver 210, which then decodes the signal bits in accordance with the teachings of the present invention and stores the received message signal in memory. In addition, the received message signal is sent by the vehicle transmitter 212 through the vehicle ID antenna 208 back through the station antenna 206 to the station receiver 214 for confirmation that the correct message signal was received. The station transmitter 204, in response to the vehicle being sensed to have arrived at a stopped position in the station adjacent the passenger platform, outputs an FSK message through the ID antenna 206. The vehicle ID antenna 208 picks up the FSK message from the wayside station and supplies it to the vehicle receiver 210. The vehicle receiver 210 includes the apparatus shown in FIG. 2, and receives the input analog signal such as shown in FIG. 3 and includes an analog to digital converter 64 to supply digital samples of the received input message, such as the 24 digital samples shown in FIG. 3, to the vehicle microprocessor CPU 66 including a memory. The CPU 66 takes four groups of 24 digital signal samples, as shown in FIG. 3 for each such group, for a total of 96 signal samples. The signal processor 66 within the vehicle receiver 210 decodes these signal samples to determine the identity of either a ONE or a ZERO frequency component in those signal samples. The receiver 210 includes a Z80A microprocessor which operates with the application program in accordance with the listing included in Appendix A. The flow chart shown in FIG. 1 functionally describes this application program. This particular application program takes in the order of 2.2 milliseconds execution time operating with the Z80A microprocessor, which is merely one suitable example chosen for the purpose of illustrating the present invention. This program is free-running and operates independently.

Figure 11:
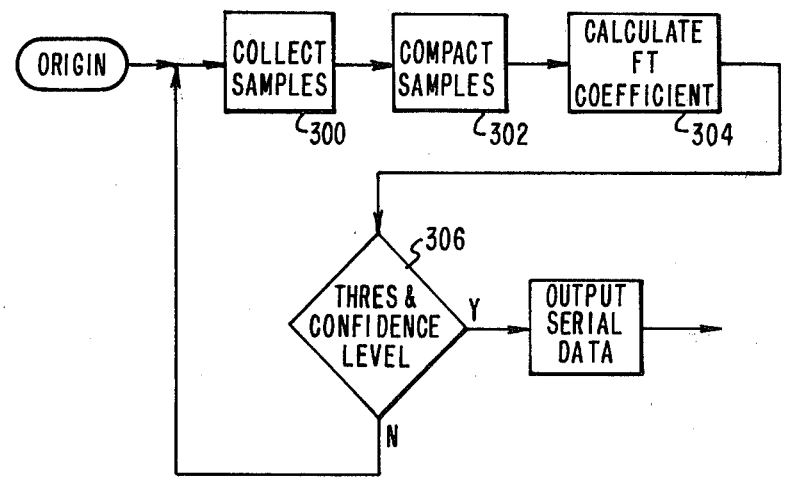
FIG. 11 shows a microprocessor program flow chart to provide the frequency signal component determination of the present invention.

The signal decoding program flow chart is shown in FIG. 11. At block 300 a collection is made of a group of 24 input signal samples, with four such superimposed groups being taken, as illustrated in FIG. 3, and stored in the memory of the Z80A microprocessor.

The Z80A microprocessor is made by Mostek, Inc. and is presently available in the open marketplace in the United States, with a general operational description of the Z80A microprocessor being provided in a Technical Manual currently available from Mostek, Inc., 1215 W. Crosby Drive, Carrollton, Tex. 75006.

At block 302, the stored samples are compacted, with the second group of 24 samples being superimposed on and summed with the first group of 24 samples, the third group of 24 samples being superimposed on and summed with the first and second groups of samples, and the fourth group of 24 samples being superimposed on and summed with the first, second and third groups of samples to form a combination grouping of 24 samples, such as generally illustrated by curve 74 shown in FIG. 3. For the f1 and f2 frequency relationship shown in FIG. 3, this combination grouping of 24 samples is further compacted to identify which of the signal frequency components f1 or f2 is present in the combination grouping of 24 samples shown by waveform 74 of FIG. 3.

The selection of the number of digital signal samples in each group collected, for example, the 24 samples shown in FIG. 3, is determined by the known frequency relationship between the desired f1 and f2 frequency signals. The f1 signal shown in FIG. 3 is known to have two full cycles for each three full cycles of f2. This integer relationship between f1 and f2, when 24 digital signal samples are taken per group, establishes 12 signal samples for each full wave of the f1 signal and 8 signal samples for each full wave of the f2 signal. In addition, it is desired that a reasonable and adequate number of signal samples be taken for each full wave of both the f1 and the f2 signals to the signal to noise ratio to improve the identification of the f1 and f2 signal components for each message signal bit.

At block 304, the fourier transform coefficients are calculated for each of the f1 and f2 signal components. This is done as previously explained for the f1 frequency component in relation to blocks 112, 114, 116 and 118 of FIG. 4 for the sine wave and in relation to blocks 120, 122, 124 and 126 of FIG. 4 for the cosine wave, with block 128 establishing the relative magnitude of the f1 frequency component. This is done as previously explained for the f2 frequency component in relation to blocks 132, 134 and 136 of FIG. 4 for the sine wave and in relation to blocks 138, 140 and 142 of FIG. 4 for the cosine wave, with block 144 establishing the relative magnitude of the f2 frequency component. It should be understood that for a greater than unity signal to noise ratio of the actual input signal received by the present signal receiving apparatus, the operation provided by block 304 might not be required to satisfactorily determine one of the desired f1 and f2 frequency components in that input signal.

At block 306 of FIG. 11 at least a predetermined threshold signal magnitude must be sensed before one of the two desired f1 or f2 frequency components is identified and output. In addition a signal confidence level is determined by running through the application program shown in FIG. 11 for a predetermined number of times for each bit of the 8 bit information message. Since the program execution time is 2.2 milliseconds, this permits five runs through the program for each bit of 11 milliseconds, and then the threshold check is made to see if one of the frequency f1 or f2 components has been determined for this predetermined number of times, such as two or three. This was previously explained in relation to block 148 of FIG. 4.

A small time delay between the respective four groups of 24 digital signal samples, as shown in FIG. 3, can be provided to widen the effective signal filter bandwidth of the present invention. For example, if the collection of each group of 24 digital signal samples requires about 14 microseconds, a time delay in the order of 1 microsecond can be provided before the collection of each succeeding group of 24 digital signal samples.

For one practical embodiment of the present invention that was actually built and tested, the program running time was 11 milliseconds per bit of an eight bit information message, for a message BAUD rate of about 90 hertz. The apparatus satisfactorily identified one of the f1 or f2 signal components with less than a unit signal to noise ratio, because of the provided correlation for two known f1 and f2 frequency desired signal components and the effective masking of random noise signals by the additive superimposition of the groups of sampled data signals. The prior art signal receivers for the similar noise environment were limited to about a 6 dB signal to noise ratio.

In FIG. 12, curve 400 illustrates the input signal frequency component analysis that would be expected using the conventional prior art Fourier transform analysis to identify component frequencies of the input signal, and shows the apparent frequency response for the purpose of frequency component identification between input and output signals. Curve 402 shows the improved operation frequency response provided by the present signal receiving apparatus to in effect provide a better signal frequency response in relation to predetermined desired f1 and f2 frequency signal components, with the centerline 404 being respectively determined as shown in FIG. 4 in relation to each of the desired frequency components f1 and f2. In addition, increasing the number of signal sample groups taken, for example take 8 groups of 24 data samples instead of the previously described 4 groups of 24 data samples as shown in FIG. 3, will operate to tighten the filter characteristic frequency response of the present signal receiving apparatus.

In FIG. 13 there is shown for practical operation of the present signal receiving apparatus, how the magnitude of the desired frequency signal 410 can relate to the unity or average noise signal level 412 and still provide a satisfactory identification of the desired frequency signal 410. An illustrative provided signal threshold 414 is generally shown, such as would be utilized in block 148 of FIG. 4 and block 306 of FIG. 11.

In FIG. 14 there is shown a block diagram of one practical embodiment of the signal receiving apparatus of the present invention. The antenna 50A, the isolation transformer 52A, the filter 54A and the preamplifier 56A operate with the desired f1 signal frequency component, and the antenna 50B, the isolation transformer 52B, the filter 54B and the preamplifier 56B operate with the desired f2 signal frequency component. The circuit elements shown in FIG. 14 correspond with similar circuit elements shown in FIG. 2. The signal processor CPU 66, which can include the Z80A microprocessor, operates in accordance with the functional diagram of FIG. 4 and the program flow chart of FIG. 11. The input port 66A is an 8 bit data register with a clock to input the data, which goes to the Z80A microprocessor 66B when the input port is enabled by the microprocessor. The program shown in FIG. 11 is stored in the EPROM 66C and controls the operation of the microprocessor 66B. The microprocessor 66B controls the analog to digital conversion by the A to D converter 64, and the resulting parallel data enters through the input port 66A. The program shown in FIG. 11 is executed every 2.2 milliseconds to analyze the input data samples, and the individual bits of the information message input signal that are identified are clocked through the output port 66D to a suitable utilization apparatus. If desired, a memory can be provided to store the output signal bits.

When the microprocessor 66B executes the program illustrated in FIG. 11, the input signal is processed one bit at a time. After a predetermined number of such program executions for the purpose of determining the confidence level of a particular identified signal bit, for example three such executions, the data bit is output through the output port 66D. With each input bit providing eleven milliseconds of data and the program execution taking 2.2 milliseconds of time, this permits five program executions per bit. Since the five program executions might overlap and fall between two f1 and f2 frequency portions, when a frequency change does occur and the new frequency component is determined for three consecutive times to be above the desired threshold magnitude, then the new frequency is output. For each 2.2 milliseconds execution of the program, the signal bit data is stored in the RAM 66E, and for each execution of the program the identified bit data is compared with the previously determined bit data. If the identified signal bits for all of a predetermined number of program executions are the same and above the threshold magnitude then the satisfactory confidence level of the identified signal bit is established.

The initial superimposed signal bit samples, in accordance with blocks 102, 104, 106, and 108 of FIG. 4 are also stored in RAM storage 66E. The EPROM storage 66C contains the application program in accordance with FIG. 11 and additional and well known multiplication look up tables to simplify the respective multiplications of blocks 128 and 144 of FIG. 8 to develop the squared values of f1 and f2, for the value range of interest of the frequencies f1 and f2. For example, the typical value range of interest here can be from 16 up to 255, with the look up tables including each of the values for $(16)^2$ and $(17)^2$ and so forth up to $(255)^2$.

For the signal receiving apparatus as shown in FIG. 14, the following components are presently available in the marketplace in the United States and were utilized to make one suitable embodiment of the present invention.

| Device | Supplier |
|---|---|
| input port 66A | Advanced Micro Devices 74LS374 |
| microprocessor 66B | Mostek, Inc. Z80A |
| EPROM 66C | Intel 2716 |
| A to D Converter 64 | Burr Brown 82AG |
| output port 66D | Texas Instruments 74LS74 |
| RAM 66E | Intel 2142 |

In the Appendix there is included an instruction program listing that has been prepared to control the operation of the here disclosed signal receiving apparatus and method. The instruction program listing is written in the assembly language of the Mostek Z80A microprocessor. Many of these microprocessors have already been supplied to customers, including technical instruction manuals and descriptive documentation to explain to persons skilled in this art the operation of the microprocessor apparatus. This instruction program listing is included to provide an illustration of one suitable embodiment of the present invention that has actually been made and operated. This instruction program listing at the present time is a more or less development program and has not been extensively debugged through the course of practical operation for the real time control of a signal receiving apparatus. It is well known by persons skilled in this art that most real time control application programs contain some bugs or minor errors, and it usually takes varying periods of actual operation time to identify and routinely correct the more critical of these bugs.

```
              00100 ;***********************
              00110 ;         FFT2                  6 AUG 79
              00120 ;HIGH SPEED RECEIVER
              00130 ;    (226P380)
              00140 ; SOFTWARE PROGRAM
              00150 ;***********************
0000          00160         ORG     0000H
0830          00170 HI      EQU     0830H
0831          00180 H1      EQU     0831H
0832          00190 LO      EQU     0832H
```

```
0833              00200 L1      EQU     0833H
0834              00210 THRES   EQU     0834H
082B              00220 S1LO    EQU     082BH
082A              00230 S2LO    EQU     082AH
0829              00240 S3LO    EQU     0829H
0828              00250 S4LO    EQU     0828H
0827              00260 S5LO    EQU     0827H
0826              00270 S6LO    EQU     0826H
0825              00280 S7LO    EQU     0825H
0824              00290 S8LO    EQU     0824H
0823              00300 S9LO    EQU     0823H
0822              00310 S10LO   EQU     0822H
0821              00320 S11LO   EQU     0821H
0820              00330 S12LO   EQU     0820H
0807              00340 S1HI    EQU     0807H
0806              00350 S2HI    EQU     0806H
0805              00360 S3HI    EQU     0805H
0804              00370 S4HI    EQU     0804H
0803              00380 S5HI    EQU     0803H
0802              00390 S6HI    EQU     0802H
0801              00400 S7HI    EQU     0801H
0800              00410 S8HI    EQU     0800H
0000 010600       00420         LD      BC,06H     ;CLEAR MEMORY LOCATIONS
0003 213008       00430         LD      HL,0830H   ;0830H THRU 0834H
0006 3600         00440         LD      (HL),00H
0008 113108       00450         LD      DE,0831H
000B EDB0         00460         LDIR
000D 011800       00470 NDATA   LD      BC,18H     ;CLEAR MEMORY LOCATIONS
0010 210008       00480         LD      HL,0800H   ;0800H THRU 082BH
0013 3600         00490         LD      (HL),00H
0015 110108       00500         LD      DE,0801H
0018 EDB0         00510         LDIR
001A 211708       00520         LD      HL,0817H
001D 1100A0       00530         LD      DE,0A000H  ;ADDRESS OF INP PORT
0020 0604         00540         LD      B,04H      ;LOOP COUNTER
0022 0E14         00550         LD      C,14H      ;SAMPLE LIMITER
0024 1A           00560 SAMPLE  LD      A,(DE)     ;SAMPLE ROUTINE
0025 B9           00570         CP      C          ;
0026 3803         00580         JR      C,NOF1     ;COLLECTS A SINGLE ARRAY
0028 79           00590         LD      A,C        ;OF 24 SAMPLES AND ADDS
0029 1803         00600         JR      RSME1      ;THE PRESENT SAMPLE TO
002B 30FE         00610 NOF1    JR      NC,NOF1    ;THE PREVIOUS SAMPLE
002D 00           00620         NOP                ;4 TIMES FOR A TOTAL
002E 86           00630 RSME1   ADD     A,(HL)     ;OF 96 SAMPLES
002F 77           00640         LD      (HL),A
0030 2D           00650         DEC     L
0031 1A           00660         LD      A,(DE)
0032 B9           00670         CP      C
0033 3803         00680         JR      C,NOF2
0035 79           00690         LD      A,C
0036 1803         00700         JR      RSME2
0038 30FE         00710 NOF2    JR      NC,NOF2
003A 00           00720         NOP
003B 86           00730 RSME2   ADD     A,(HL)
003C 77           00740         LD      (HL),A
003D 2D           00750         DEC     L
003E 1A           00760         LD      A,(DE)
003F B9           00770         CP      C
0040 3803         00780         JR      C,NOF3
0042 79           00790         LD      A,C
0043 1803         00800         JR      RSME3
0045 30FE         00810 NOF3    JR      NC,NOF3
0047 00           00820         NOP
0048 86           00830 RSME3   ADD     A,(HL)
```

```
0049 77      00840        LD    (HL),A
004A 2D      00850        DEC   L
004B 1A      00860        LD    A,(DE)
004C B9      00870        CP    C
004D 3803    00880        JR    C,NOF4
004F 79      00890        LD    A,C
0050 1803    00900        JR    RSME4
0052 30FE    00910 NOF4   JR    NC,NOF4
0054 00      00920        NOP
0055 86      00930 RSME4  ADD   A,(HL)
0056 77      00940        LD    (HL),A
0057 2D      00950        DEC   L
0058 1A      00960        LD    A,(DE)
0059 B9      00970        CP    C
005A 3803    00980        JR    C,NOF5
005C 79      00990        LD    A,C
005D 1803    01000        JR    RSME5
005F 30FE    01010 NOF5   JR    NC,NOF5
0061 00      01020        NOP
0062 86      01030 RSME5  ADD   A,(HL)
0063 77      01040        LD    (HL),A
0064 2D      01050        DEC   L
0065 1A      01060        LD    A,(DE)
0066 B9      01070        CP    C
0067 3803    01080        JR    C,NOF6
0069 79      01090        LD    A,C
006A 1803    01100        JR    RSME6
006C 30FE    01110 NOF6   JR    NC,NOF6
006E 00      01120        NOP
006F 86      01130 RSME6  ADD   A,(HL)
0070 77      01140        LD    (HL),A
0071 2D      01150        DEC   L
0072 1A      01160        LD    A,(DE)
0073 B9      01170        CP    C
0074 3803    01180        JR    C,NOF7
0076 79      01190        LD    A,C
0077 1803    01200        JR    RSME7
0079 30FE    01210 NOF7   JR    NC,NOF7
007B 00      01220        NOP
007C 86      01230 RSME7  ADD   A,(HL)
007D 77      01240        LD    (HL),A
007E 2D      01250        DEC   L
007F 1A      01260        LD    A,(DE)
0080 B9      01270        CP    C
0081 3803    01280        JR    C,NOF8
0083 79      01290        LD    A,C
0084 1803    01300        JR    RSME8
0086 30FE    01310 NOF8   JR    NC,NOF8
0088 00      01320        NOP
0089 86      01330 RSME8  ADD   A,(HL)
008A 77      01340        LD    (HL),A
008B 2D      01350        DEC   L
008C 1A      01360        LD    A,(DE)
008D B9      01370        CP    C
008E 3803    01380        JR    C,NOF9
0090 79      01390        LD    A,C
0091 1803    01400        JR    RSME9
0093 30FE    01410 NOF9   JR    NC,NOF9
0095 00      01420        NOP
0096 86      01430 RSME9  ADD   A,(HL)
0097 77      01440        LD    (HL),A
0098 2D      01450        DEC   L
0099 1A      01460        LD    A,(DE)
009A B9      01470        CP    C
```

```
009B 3803      01480              JR       C,NOF10
009D 79        01490              LD       A,C
009E 1803      01500              JR       RSME10
00A0 30FE      01510 NOF10        JR       NC,NOF10
00A2 00        01520              NOP
00A3 86        01530 RSME10       ADD      A,(HL)
00A4 77        01540              LD       (HL),A
00A5 2D        01550              DEC      L
00A6 1A        01560              LD       A,(DE)
00A7 B9        01570              CP       C
00A8 3803      01580              JR       C,NOF11
00AA 79        01590              LD       A,C
00AB 1803      01600              JR       RSME11
00AD 30FE      01610 NOF11        JR       NC,NOF11
00AF 00        01620              NOP
00B0 86        01630 RSME11       ADD      A,(HL)
00B1 77        01640              LD       (HL),A
00B2 2D        01650              DEC      L
00B3 1A        01660              LD       A,(DE)
00B4 B9        01670              CP       C
00B5 3803      01680              JR       C,NOF12
00B7 79        01690              LD       A,C
00B8 1803      01700              JR       RSME12
00BA 30FE      01710 NOF12        JR       NC,NOF12
00BC 00        01720              NOP
00BD 86        01730 RSME12       ADD      A,(HL)
00BE 77        01740              LD       (HL),A
00BF 2D        01750              DEC      L
00C0 1A        01760              LD       A,(DE)
00C1 B9        01770              CP       C
00C2 3803      01780              JR       C,NOF13
00C4 79        01790              LD       A,C
00C5 1803      01800              JR       RSME13
00C7 30FE      01810 NOF13        JR       NC,NOF13
00C9 00        01820              NOP
00CA 86        01830 RSME13       ADD      A,(HL)
00CB 77        01840              LD       (HL),A
00CC 2D        01850              DEC      L
00CD 1A        01860              LD       A,(DE)
00CE B9        01870              CP       C
00CF 3803      01880              JR       C,NOF14
00D1 79        01890              LD       A,C
00D2 1803      01900              JR       RSME14
00D4 30FE      01910 NOF14        JR       NC,NOF14
00D6 00        01920              NOP
00D7 86        01930 RSME14       ADD      A,(HL)
00D8 77        01940              LD       (HL),A
00D9 2D        01950              DEC      L
00DA 1A        01960              LD       A,(DE)
00DB B9        01970              CP       C
00DC 3803      01980              JR       C,NOF15
00DE 79        01990              LD       A,C
00DF 1803      02000              JR       RSME15
00E1 30FE      02010 NOF15        JR       NC,NOF15
00E3 00        02020              NOP
00E4 86        02030 RSME15       ADD      A,(HL)
00E5 77        02040              LD       (HL),A
00E6 2D        02050              DEC      L
00E7 1A        02060              LD       A,(DE)
00E8 B9        02070              CP       C
00E9 3803      02080              JR       C,NOF16
00EB 79        02090              LD       A,C
00EC 1803      02100              JR       RSME16
00EE 30FE      02110 NOF16        JR       NC,NOF16
00F0 00        02120              NOP
```

```
00F1 86        02130 RSME16   ADD    A,(HL)
00F2 77        02140          LD     (HL),A
00F3 2D        02150          DEC    L
00F4 1A        02160          LD     A,(DE)
00F5 B9        02170          CP     C
00F6 3803      02180          JR     C,NOF17
00F8 79        02190          LD     A,C
00F9 1803      02200          JR     RSME17
00FB 30FE      02210 NOF17    JR     NC,NOF17
00FD 00        02220          NOP
00FE 86        02230 RSME17   ADD    A,(HL)
00FF 77        02240          LD     (HL),A
0100 2D        02250          DEC    L
0101 1A        02260          LD     A,(DE)
0102 B9        02270          CP     C
0103 3803      02280          JR     C,NOF18
0105 79        02290          LD     A,C
0106 1803      02300          JR     RSME18
0108 30FE      02310 NOF18    JR     NC,NOF18
010A 00        02320          NOP
010B 86        02330 RSME18   ADD    A,(HL)
010C 77        02340          LD     (HL),A
010D 2D        02350          DEC    L
010E 1A        02360          LD     A,(DE)
010F B9        02370          CP     C
0110 3803      02380          JR     C,NOF19
0112 79        02390          LD     A,C
0113 1803      02400          JR     RSME19
0115 30FE      02410 NOF19    JR     NC,NOF19
0117 00        02420          NOP
0118 86        02430 RSME19   ADD    A,(HL)
0119 77        02440          LD     (HL),A
011A 2D        02450          DEC    L
011B 1A        02460          LD     A,(DE)
011C B9        02470          CP     C
011D 3803      02480          JR     C,NOF20
011F 79        02490          LD     A,C
0120 1803      02500          JR     RSME20
0122 30FE      02510 NOF20    JR     NC,NOF20
0124 00        02520          NOP
0125 86        02530 RSME20   ADD    A,(HL)
0126 77        02540          LD     (HL),A
0127 2D        02550          DEC    L
0128 1A        02560          LD     A,(DE)
0129 B9        02570          CP     C
012A 3803      02580          JR     C,NOF21
012C 79        02590          LD     A,C
012D 1803      02600          JR     RSME21
012F 30FE      02610 NOF21    JR     NC,NOF21
0131 00        02620          NOP
0132 86        02630 RSME21   ADD    A,(HL)
0133 77        02640          LD     (HL),A
0134 2D        02650          DEC    L
0135 1A        02660          LD     A,(DE)
0136 B9        02670          CP     C
0137 3803      02680          JR     C,NOF22
0139 79        02690          LD     A,C
013A 1803      02700          JR     RSME22
013C 30FE      02710 NOF22    JR     NC,NOF22
013E 00        02720          NOP
013F 86        02730 RSME22   ADD    A,(HL)
0140 77        02740          LD     (HL),A
0141 2D        02750          DEC    L
0142 1A        02760          LD     A,(DE)
0143 B9        02770          CP     C
```

```
0144 3803      02780           JR      C, NOF23
0146 79        02790           LD      A, C
0147 1803      02800           JR      RSME23
0149 30FE      02810  NOF23    JR      NC, NOF23
014B 00        02820           NOP
014C 86        02830  RSME23   ADD     A, (HL)
014D 77        02840           LD      (HL), A
014E 2D        02850           DEC     L
014F 1A        02860           LD      A, (DE)
0150 B9        02870           CP      C
0151 3801      02880           JR      C, NOF24
0153 79        02890           LD      A, C
0154 86        02900  NOF24    ADD     A, (HL)
0155 77        02910           LD      (HL), A
0156 2E17      02920           LD      L, 17H
0158 05        02930           DEC     B
0159 00        02940           NOP
015A 00        02950           NOP
015B 00        02960           NOP
015C C22400    02970           JP      NZ, SAMPLE
015F 012B08    02980           LD      BC, 082BH   ; SAMPLE COMPACTION
0162 211708    02990           LD      HL, 0817H   ;
0165 110B08    03000           LD      DE, 080BH
0168 1A        03010  CPAC1    LD      A, (DE)     ; COMPACTS SAMPLES INTO AN
0169 86        03020           ADD     A, (HL)     ; ARRAY OF 1'S FREQUENCY
016A CB1F      03030           RR      A           ; SAMPLES
016C A7        03040           AND     A
016D CB1F      03050           RR      A           ; DIVIDE SAMPLE BY 4
016F 02        03060           LD      (BC), A
0170 2D        03070           DEC     L
0171 0D        03080           DEC     C
0172 1D        03090           DEC     E
0173 F26801    03100           JP      P, CPAC1
0176 210F08    03110           LD      HL, 080FH
0179 D9        03120           EXX
017A 211708    03130           LD      HL, 0817H
017D 110708    03140           LD      DE, 0807H
0180 1A        03150  CPAC2    LD      A, (DE)     ; COMPACTS SAMPLES INTO AN
0181 86        03160           ADD     A, (HL)     ; ARRAY OF 0'S FREQUENCY
0182 2D        03170           DEC     L           ; SAMPLES
0183 D9        03180           EXX
0184 86        03190           ADD     A, (HL)
0185 CB1F      03200           RR      A
0187 A7        03210           AND     A
0188 CB1F      03220           RR      A           ; DIVIDE SAMPLE BY 4
018A 2D        03230           DEC     L
018B D9        03240           EXX
018C 12        03250           LD      (DE), A
018D 1D        03260           DEC     E
018E F28001    03270           JP      P, CPAC2
0191 212008    03280  SUMUR    LD      HL, S12LO   ; SUMMING AND MULTI-
0194 3A2608    03290           LD      A, (S6LO)   ; PLICATION ROUTINE
0197 96        03300           SUB     (HL)
0198 5F        03310           LD      E, A        ; E=S6-S12
0199 2C        03320           INC     L
019A 3A2708    03330           LD      A, (S5LO)
019D 96        03340           SUB     (HL)
019E 57        03350           LD      D, A        ; D=S5-S11
019F 2C        03360           INC     L
01A0 3A2808    03370           LD      A, (S4LO)
01A3 96        03380           SUB     (HL)        ; A=S4-S10
01A4 82        03390           ADD     A, D
01A5 4F        03400           LD      C, A        ; C=(S4-S10)+(S5-S11)
01A6 2C        03410           INC     L
               03420
```

| | | | | | |
|---|---|---|---|---|---|
| 01A7 | 3A2908 | 03430 | | LD | A,(S3LO) |
| 01AA | 96 | 03440 | | SUB | (HL) ;A=S3-S9 |
| 01AB | 47 | 03450 | | LD | B,A ;B=S3-S9 |
| 01AC | 81 | 03460 | | ADD | A,C |
| 01AD | 4F | 03470 | | LD | C,A ;C=(S3-S9)+(S4-S10)+ |
| | | | | | ;(S5-S11) |
| 01AE | 78 | 03480 | | LD | A,B |
| 01AF | 92 | 03490 | | SUB | D |
| 01B0 | 57 | 03500 | | LD | D,A ;D=(S3-S9)-(S5-S11) |
| 01B1 | 23 | 03510 | | INC | HL |
| 01B2 | 3A2A08 | 03520 | | LD | A,(S2LO) |
| 01B5 | 96 | 03530 | | SUB | (HL) ;A=S2-S8 |
| 01B6 | 47 | 03540 | | LD | B,A ;B=S2-S8 |
| 01B7 | 93 | 03550 | | SUB | E |
| 01B8 | 08 | 03560 | | EX | AF,AF' ;A'=(S2-S8)-(S6-S12) |
| 01B9 | 78 | 03570 | | LD | A,B |
| | | 03580 | | | |
| 01BA | 83 | 03590 | | ADD | A,E |
| 01BB | 47 | 03600 | | LD | B,A ;B=(S2-S8)+(S6-S12) |
| 01BC | 08 | 03610 | | EX | AF,AF' |
| 01BD | 5F | 03620 | | LD | E,A ;E=(S2-S8)-(S6-S12) |
| 01BE | 2C | 03630 | | INC | L |
| 01BF | 3A2B08 | 03640 | | LD | A,(S1LO) |
| 01C2 | 96 | 03650 | | SUB | (HL) ;A=S1-S7 |
| 01C3 | 83 | 03660 | | ADD | A,E ;A=(S1-S7)+(S2-S8)- |
| | | | | | ;(S6-S12) |
| 01C4 | CB28 | 03670 | | SRA | B ;B=.5(S2+S6-S8-S12) |
| 01C6 | CB2A | 03680 | | SRA | D ;D=.5(S3-S5-S9+S11) |
| 01C8 | CB2F | 03690 | | SRA | A ;DIVIDE ALL TERMS BY 2 |
| 01CA | CB28 | 03700 | | SRA | B ;TO PROTECT AGAINST |
| 01CC | CB29 | 03710 | | SRA | C ;OVERFLOW |
| 01CE | CB2A | 03720 | | SRA | D |
| 01D0 | 82 | 03730 | | ADD | A,D |
| 01D1 | 08 | 03740 | | EX | AF,AF' ;A'=SIN |
| 01D2 | 79 | 03750 | | LD | A,C |
| 01D3 | 80 | 03760 | | ADD | A,B ;A=COS |
| 01D4 | 2607 | 03770 | | LD | H,07H |
| 01D6 | FE80 | 03780 | | CP | 80H |
| 01D8 | 3802 | 03790 | | JR | C,POS1 |
| 01DA | ED44 | 03800 | | NEG | ;A=ABS(COS) |
| 01DC | 87 | 03810 | POS1 | ADD | A,A |
| 01DD | 6F | 03820 | | LD | L,A ;HL=ADDRESS OF SQUARE IN |
| 01DE | 5E | 03830 | | LD | E,(HL) ;LOOK-UP TABLE |
| 01DF | 2C | 03840 | | INC | L |
| 01E0 | 56 | 03850 | | LD | D,(HL) ;DE=COS**2 |
| 01E1 | 08 | 03860 | | EX | AF,AF' |
| 01E2 | FE80 | 03870 | | CP | 80H |
| 01E4 | 3802 | 03880 | | JR | C,POS2 |
| 01E6 | ED44 | 03890 | | NEG | |
| 01E8 | 87 | 03900 | POS2 | ADD | A,A |
| 01E9 | 6F | 03910 | | LD | L,A |
| 01EA | 4E | 03920 | | LD | C,(HL) |
| 01EB | 2C | 03930 | | INC | L |
| 01EC | 46 | 03940 | | LD | B,(HL) ;BC=SIN**2 |
| 01ED | EB | 03950 | | EX | DE,HL |
| 01EE | 09 | 03960 | | ADD | HL,BC ;HL=SIN2+COS2 |
| 01EF | 229408 | 03970 | | LD | (0894H),HL |
| 01F2 | 210008 | 03980 | HIGH | LD | HL,S8HI |
| 01F5 | 3A0408 | 03990 | | LD | A,(S4HI) |
| 01F8 | 96 | 04000 | | SUB | (HL) |
| 01F9 | 5F | 04010 | | LD | E,A ;E=S4-S8 |
| 01FA | 2C | 04020 | | INC | L |
| 01FB | 3A0508 | 04030 | | LD | A,(S3HI) |
| 01FE | 96 | 04040 | | SUB | (HL) |
| 01FF | 57 | 04050 | | LD | D,A ;D=S3-S7 |

```
0200 2C        04060        INC   L
0201 3A0608    04070        LD    A,(S2HI)
0204 96        04080        SUB   (HL)      ;A=S2-S6
0205 4F        04090        LD    C,A       ;C=S2-S6
0206 93        04100        SUB   E
0207 47        04110        LD    B,A       ;B=(S2-S6)-(S4-S8)
0208 79        04120        LD    A,C
0209 83        04130        ADD   A,E
020A 5F        04140        LD    E,A       ;E=(S2-S6)+(S4-S8)
020B 2C        04150        INC   L
020C 3A0708    04160        LD    A,(S1HI)
020F 96        04170        SUB   (HL)      ;A=S1-S5
0210 4F        04180        LD    C,A       ;C=S1-S5
0211 CB28      04190        SRA   B
0213 78        04200        LD    A,B
0214 CB28      04210        SRA   B
0216 80        04220        ADD   A,B       ;A=.75(S2-S4-S6+S8)
0217 CB2F      04230        SRA   A         ;DIVIDE BY 2 TO
0219 CB29      04240        SRA   C         ;PREVENT OVERFLOW
021B 81        04250        ADD   A,C       ;A=COS
021C FE80      04260        CP    80H
021E 3802      04270        JR    C,POS3
0220 ED44      04280        NEG
0222 2607      04290 POS3   LD    H,07H
0224 87        04300        ADD   A,A
0225 6F        04310        LD    L,A       ;HL=ADDRESS OF SQUARE IN
0226 4E        04320        LD    C,(HL)    ;LOOK-UP TABLE
0227 2C        04330        INC   L
0228 46        04340        LD    B,(HL)    ;BC=COS**2
0229 CB2B      04350        SRA   E
022B 7B        04360        LD    A,E
022C CB2B      04370        SRA   E
022E 83        04380        ADD   A,E       ;A=.75(S2+S4-S6-S8)
022F CB2F      04390        SRA   A         ;DIVIDE BY 2 TO
0231 CB2A      04400        SRA   D         ;PREVENT OVERFLOW
0233 82        04410        ADD   A,D       ;A=SIN
0234 FE80      04420        CP    80H
0236 3802      04430        JR    C,POS4
0238 ED44      04440        NEG
023A 87        04450 POS4   ADD   A,A
023B 6F        04460        LD    L,A       ;HL=ADDRESS OF SQUARE IN
023C 5E        04470        LD    E,(HL)    ;LOOK-UP TABLE
023D 2C        04480        INC   L
023E 56        04490        LD    D,(HL)    ;DE=SIN**2
023F EB        04500        EX    DE,HL
0240 09        04510        ADD   HL,BC     ;HL=SIN**2+COS**2
0241 229608    04520        LD    (0896H),HL
0244 ED4B9408  04530 MAX    LD    BC,(0894H);1'S FREQUENCY
0248 2A9608    04540        LD    HL,(0896H);0'S FREQUENCY
024B 78        04550        LD    A,B
024C BC        04560        CP    H
024D F25802    04570        JP    P,CLEVA1
0250 7C        04580        LD    A,H
0251 B8        04590        CP    B
0252 F26002    04600        JP    P,CLEVA2
0255 C30D00    04610        JP    NDATA
0258 FE03      04620 CLEVA1 CP    03H       ;THRESHOLD OF 1'S FREQ
025A F2A902    04630        JP    P,LOFREQ
025D F26502    04640        JP    DECTH
0260 FE02      04650 CLEVA2 CP    02H       ;THRESHOLD OF 0'S FREQ
0262 F27402    04660        JP    P,HIFREQ
0265 3A3408    04670 DECTH  LD    A,(THRES) ;THRESHOLD DECREMENTER
0268 FE01      04680        CP    01H
026A CA0D00    04690        JP    Z,NDATA
026D 3D        04700        DEC   A
```

```
026E 323408    04710           LD     (THRES),A
0271 C30D00    04720           JP     NDATA
0274 3A3408    04730  HIFREQ   LD     A,(THRES)   ;0'S FREQUENCY
0277 3C        04740           INC    A
0278 FE07      04750           CP     07H
027A F28302    04760           JP     P,THOLD2
027D 323408    04770           LD     (THRES),A
0280 C30D00    04780           JP     NDATA
0283 FE08      04790  THOLD2   CP     08H         ;CONFIDENCE LEVEL
0285 F28C02    04800           JP     P,HIDET
0288 3C        04810           INC    A
0289 323408    04820           LD     (THRES),A
028C 3EFF      04830  HIDET    LD     A,0FFH      ;0'S FREQ DETECTION
028E 323008    04840           LD     (HI),A
0291 3E00      04850           LD     A,00H
0293 323208    04860           LD     (LO),A
0296 323308    04870           LD     (L1),A
0299 3A3108    04880           LD     A,(H1)
029C FEFF      04890           CP     0FFH
029E CADE02    04900           JP     Z,OUT
02A1 3EFF      04910           LD     A,0FFH
02A3 323108    04920           LD     (H1),A
02A6 C30D00    04930           JP     NDATA
02A9 3A3408    04940  LOFREQ   LD     A,(THRES)   ;1'S FREQUENCY
02AC 3C        04950           INC    A
02AD FE07      04960           CP     07H
02AF F2B802    04970           JP     P,THOLD3
02B2 323408    04980           LD     (THRES),A
02B5 C30D00    04990           JP     NDATA
02B8 FE08      05000  THOLD3   CP     08H         ;CONFIDENCE LEVEL
02BA F2C102    05010           JP     P,LODET
02BD 3C        05020           INC    A
02BE 323408    05030           LD     (THRES),A
02C1 3EFF      05040  LODET    LD     A,0FFH      ;1'S FREQ DETECTION
02C3 323208    05050           LD     (LO),A
02C6 3E00      05060           LD     A,00H
02C8 323008    05070           LD     (HI),A
02CB 323108    05080           LD     (H1),A
02CE 3A3308    05090           LD     A,(L1)
02D1 FEFF      05100           CP     0FFH
02D3 CADE02    05110           JP     Z,OUT
02D6 3EFF      05120           LD     A,0FFH
02D8 323308    05130           LD     (L1),A
02DB C30D00    05140           JP     NDATA
02DE 3A3108    05150  OUT      LD     A,(H1)
02E1 FEFF      05160           CP     0FFH
02E3 CAEE02    05170           JP     Z,OUT0
02E6 3EFF      05180  OUT1     LD     A,0FFH      ;OUTPUT 1'S FREQ DATA
02E8 320090    05190           LD     (9000H),A
02EB C30D00    05200           JP     NDATA
02EE 3E00      05210  OUT0     LD     A,00H       ;OUTPU 0'S FREQ DATA
02F0 320090    05220           LD     (9000H),A
02F3 C30D00    05230           JP     NDATA
0000           05240           END

00000 TOTAL ERRORS
OUT1      02E6              LOFREQ    02A9
OUT0      02EE              CLEVA2    0260
LODET     02C1              CLEVA1    0258
THOLD3    02B8              MAX       0244
OUT       02DE              POS4      023A
HIDET     028C              POS3      0222
THOLD2    0283              HIGH      01F2
HIFREQ    0274              POS2      01E8
DECTH     0265              POS1      01DC
```

| | |
|---|---|
| SUMUR | 0191 |
| CPAC2 | 0180 |
| CPAC1 | 0168 |
| NOF24 | 0154 |
| RSME23 | 014C |
| NOF23 | 0149 |
| RSME22 | 013F |
| NOF22 | 013C |
| RSME21 | 0132 |
| NOF21 | 012F |
| RSME20 | 0125 |
| NOF20 | 0122 |
| RSME19 | 0118 |
| NOF19 | 0115 |
| RSME18 | 010B |
| NOF18 | 0108 |
| RSME17 | 00FE |
| NOF17 | 00FB |
| RSME16 | 00F1 |
| NOF16 | 00EE |
| RSME15 | 00E4 |
| NOF15 | 00E1 |
| RSME14 | 00D7 |
| NOF14 | 00D4 |
| RSME13 | 00CA |
| NOF13 | 00C7 |
| RSME12 | 00BD |
| NOF12 | 00BA |
| RSME11 | 00B0 |
| NOF11 | 00AD |
| RSME10 | 00A3 |
| NOF10 | 00A0 |
| RSME9 | 0096 |
| NOF9 | 0093 |
| RSME8 | 0089 |
| NOF8 | 0086 |
| RSME7 | 007C |
| NOF7 | 0079 |
| RSME6 | 006F |
| NOF6 | 006C |
| RSME5 | 0062 |
| NOF5 | 005F |
| RSME4 | 0055 |
| NOF4 | 0052 |
| RSME3 | 0048 |
| NOF3 | 0045 |
| RSME2 | 003B |
| NOF2 | 0038 |
| RSME1 | 002E |
| NOF1 | 002B |
| SAMPLE | 0024 |
| NDATA | 000D |
| S8HI | 0800 |
| S7HI | 0801 |
| S6HI | 0802 |
| S5HI | 0803 |
| S4HI | 0804 |
| S3HI | 0805 |
| S2HI | 0806 |
| S1HI | 0807 |
| S12LO | 0820 |
| S11LO | 0821 |
| S10LO | 0822 |
| S9LO | 0823 |
| S8LO | 0824 |
| S7LO | 0825 |
| S6LO | 0826 |
| S5LO | 0827 |
| S4LO | 0828 |
| S3LO | 0829 |
| S2LO | 082A |
| S1LO | 082B |
| THRES | 0834 |
| L1 | 0833 |
| L0 | 0832 |
| H1 | 0831 |
| HI | 0830 |

We claim:

1. In signal receiving apparatus operative with an input signal to determine the presence of a signal component having a known frequency characteristic, the combination of means for taking a selected number of data samples of the input signal with said number having an integer relationship with said frequency characteristic, means for providing a signal waveform by superimposing at least first and second groups of said data samples with said groups being predetermined in accordance with the known frequency of said signal component, means for establishing in relation to each data sample position of said signal a first product of the signal waveform data for that position and the value of a reference sine wave for that same position, with the reference sine wave being determined by the known frequency characteristic, means for establishing in relation to each of said data sample positions a second product of the signal waveform data for that position and the value of a reference cosine wave for that same position, with the reference cosine wave being determined by the known frequency characteristic, means for combining said first and second products, and means for establishing from said combined products the presence of the signal component in relation to a desired threshold magnitude for the signal component.

2. The signal receiving apparatus of claim 1, with said selected number of data samples having an integer relationship determined to include a plurality of full cycles of said signal component within said number of data samples.

3. The signal receiving apparatus of claim 1, with the means for taking a selected number of data samples providing a desired input signal bandpass filter characteristic and with the number of samples being variable to vary the provided filter characteristic.

4. The signal receiving apparatus of claim 1 operative with a signal component having a known frequency characteristic, with the selected number of data samples being determined in relation to the known frequency of the signal component.

5. The signal receiving apparatus of claim 1, with the signal waveform providing means being operative to sum the data samples for the respective data sample positions of each of said groups.

6. The signal receiving apparatus of claim 1, with the presence establishing means providing an output having a magnitude determined by the presence of the signal component in the input signal and with said including a comparison of that magnitude with said desired threshold magnitude of the signal component.

7. In signal receiving apparatus operative with an input signal to determine the presence of a plurality of signal components, with each such signal component having a different frequency, the combination of
   means for collecting a number of samples of the input signal, with said number having an integer relationship with the frequency of each of said signal components,
   means for compacting the collected samples by establishing predetermined groups of said samples and superimposing all said groups such that the samples are respectively summed, at each sample position in the superimposed groups with said groups having a predetermined relationship with the frequencies of the plurality of signal components,
   means for establishing transform coefficients for each of the signal components in accordance with sine and cosine wave relationships respectively for each signal component frequency and determining the magnitude of each signal component as a function of said transform coefficients for the latter signal component, and
   means for determining the presence of each signal component by comparing the determined magnitude of that signal component with a predetermined threshold value for the same signal component.

8. The signal receiving apparatus of claim 7, including
   means for repeating the signal component presence determination for a predetermined number of times to improve the confidence level by checking to see that the presence of at least one signal component has been determined for this predetermined number of times.

9. The method of determining in an input signal the presence of a signal component having a known frequency characteristic, including the steps of
   sampling the input signal to provide a selected number of data samples, with said number having an integer relationship with a full cycle of said frequency characteristic,
   compacting the selected data samples by superimposing predetermined groups of said data samples to provide a signal waveform, with said groups being predetermined in relation to said frequency characteristic,
   establishing correlation coefficients for the respective superimposed data sample positions in said signal waveform, with said correlation coefficients being established in relation to each of a reference sine wave and a reference cosine wave in accordance with said frequency characteristic,
   determining a first product of said sine coefficient and the data sample for each data sample position,
   determining a second product of said cosine coefficient and the data sample for each data sample position, and
   establishing from said first and second products the presence of the signal component in said input signal.

10. The method of claim 1 for determining in the input signal at least first and second signal components having respectively first and second frequency characteristics,
   with said selected number of data samples having an integer relationship with a full cycle of each of said first and second frequency characteristics,
   with said predetermined groups being predetermined in relation to the respective first and second frequency characteristics,
   with correlation coefficients being established for each of a reference sine wave and a reference cosine wave in accordance with respectively said first and second frequency characteristics,
   with first products being determined in relation to each of said first and second frequency characteristics,
   with second products being determined in relation to each of said first and second frequency characteristics, and
   establishing from the first and second products for the first frequency characteristic the presence of said first signal component and establishing from the first and second products for the second frequency characteristic the presence of said second signal component.

11. The method of claim 9, with said compacting being provided such that each succeeding predetermined groups of data samples is additively superimposed on a first such group of data samples.

12. The method of claim 9, including the compacting step providing a second waveform by superimposing a plurality of the data samples in the signal waveform with at least one similar additional plurality of those data samples, with said plurality of data samples being determined by the known frequency characteristic of the signal component, such that the sum of the resulting data samples in each position of said plurality is summed,
   establishing said correlation coefficients for the data sample positions of the second waveform, and
   determining the first and second products in relation to the data sample positions of the second waveform.

* * * * *